March 18, 1958 G. W. RUSLER, JR 2,827,250
AUTOMATIC PILOTS FOR AIRCRAFT
Filed Feb. 11, 1954 2 Sheets-Sheet 1

INVENTOR.
GEORGE W. RUSLER, JR.
BY
*George H Fisher*
ATTORNEY

INVENTOR.
GEORGE W. RUSLER, JR.
BY George H Fisher
ATTORNEY

United States Patent Office 2,827,250
Patented Mar. 18, 1958

2,827,250

AUTOMATIC PILOTS FOR AIRCRAFT

George W. Rusler, Jr., Minneapolis, Minn., assignor to Minneapolis-Honeywell Regulator Company, Minneapolis, Minn., a corporation of Delaware Application February 11, 1954, Serial No. 409,711

12 Claims. (Cl. 244—77)

This invention pertains to automatic pilots for dirigible craft such as aircraft and more precisely is concerned with apparatus for operating a rudder control surface of said aircraft for controlling the angular position of the craft about the vertical axis thereof.

An object of this invention is to control the operation of the rudder surface in response to the rate of angular motion of the craft about the vertical axis and the sideslip of the craft, to damp the Dutch roll of the craft and reduce sideslip in transient or steady state maneuvers.

A further object of this invention is to provide a novel control of the operation of the rudder surface which is responsive to the prior operation of the ailerons to damp movements of the craft about the vertical axis due to transient disturbances about the roll axis or to coordinate the operation of the rudder during banked turns of the craft.

A further object of this invention is to provide for novel gyroscopic stabilization of the aircraft's yaw axis from a yaw rate gyroscope, combined with means for maintenance of calibrated coordination of maneuvers which is supplemented by means for maintaining the sideslip near zero, as averaged over a short period, without producing the undesirable yawing necessary to keep the instantaneous sideslip at zero in rough air.

A further object of this invention is to provide an automatic pilot for an aircraft for operating the rudder surface thereof which rudder operation is initiated in one instance in response to aileron displacement, whereby the human pilot need only to control the ailerons and elevator while the automatic pilot controls the rudder to coordinate banked turns or in another instance during level flight to damp the oscillations of the craft resulting from its poor directional stability.

Figure 1:
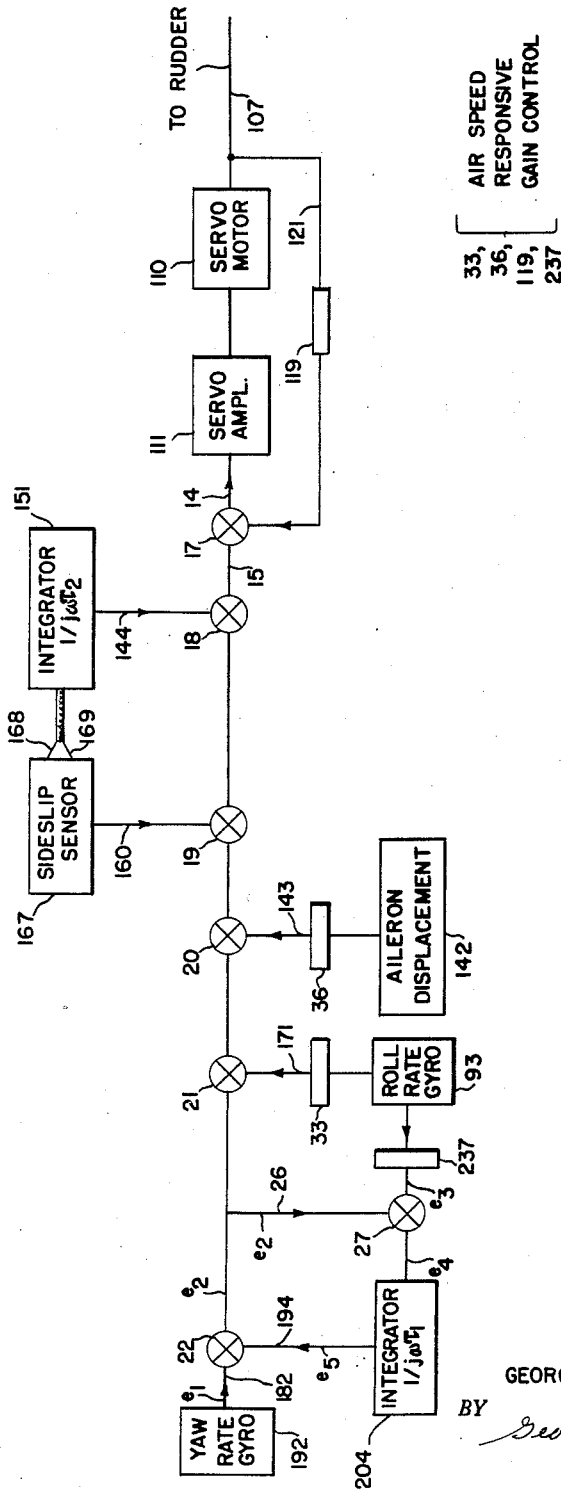
Figure 2:
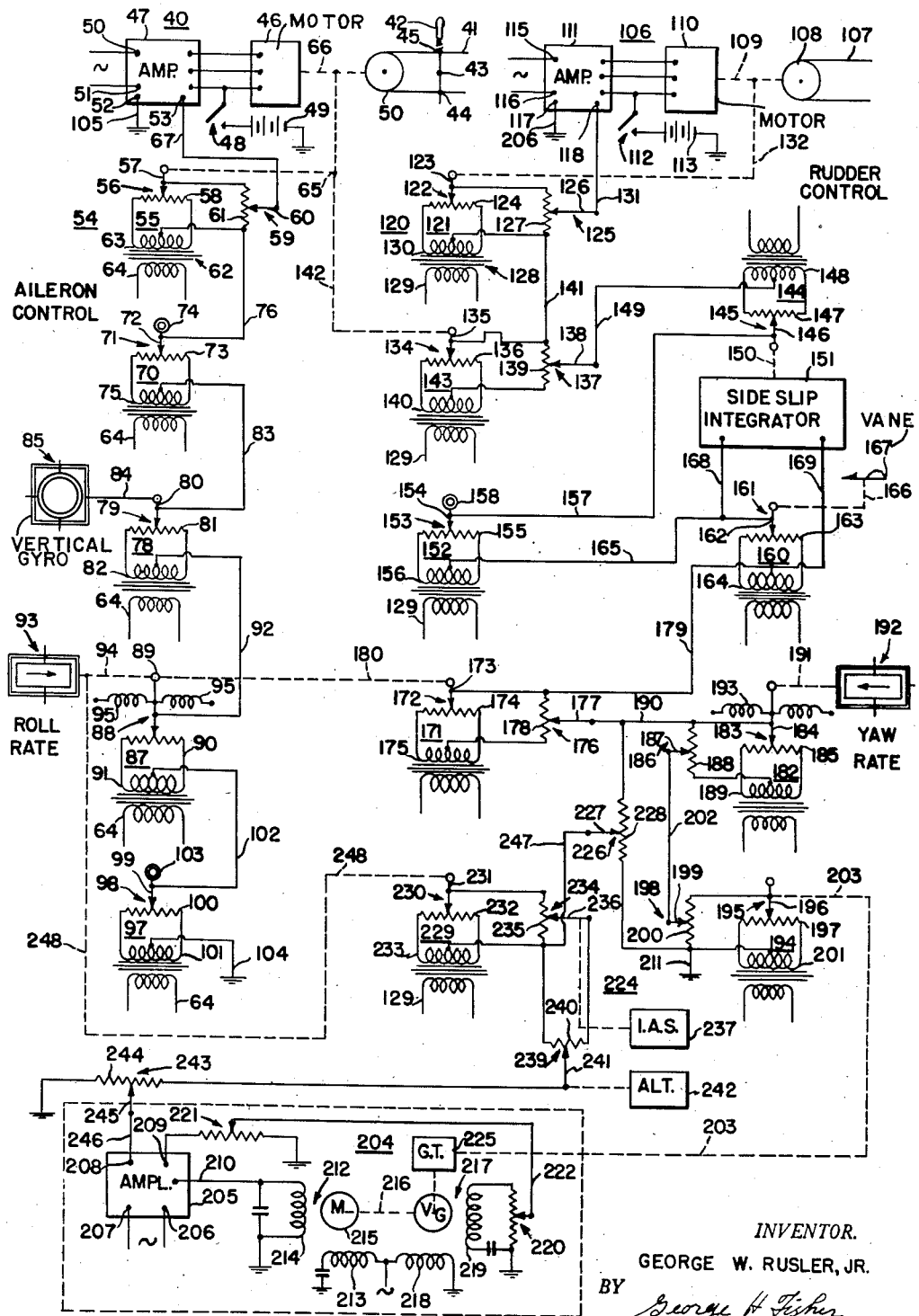

The above and further objects and aims of the invention will become apparent upon reference to the following description taken in conjunction with the annexed drawings wherein:

Figure 1 illustrates a block or functional diagram of the rudder axis control system of this invention; and Figure 2 is a detailed schematic arrangement of a preferred embodiment of the rudder axis control system for achieving the aforementioned objects.

In Figure 1, the structure for operating the rudder surface of the craft has two modes of operation, that is operation during straight and level flight to prevent oscillations about the vertical axis and another during banked turns to coordinate operation of the rudder with that of the aileron surfaces to avoid side slip or skid of the craft in such banked turn. The rudder surface, not shown, is operated by a rudder servomotor 110 which is controlled from a servomotor amplifier 111. The amplifier 111 may be of the voltage discriminator type and receives control signal voltages from the operation of control devices namely: a yaw rate gyroscope 192, a roll rate gyroscope 93, an integrator 204 operating upon an output of a roll rate gyro, an operator 142 dependent upon aileron displacement, a side slip sensor 167, and a side slip control integrator 151. The signals to amplifier 111 are balanced through a servomotor follow-up means 121. Differential devices 17, 18, 19, 20, 21, and 22 merely indicate the summation of the operation of the control and follow-up devices which may be achieved specifically by electrical signal summing methods.

During the straight and level flight, the yaw rate gyroscope 192 controls the servo amplifier 111 to effect operation of the rudder to damp oscillations of the aircraft about its vertical axis and the arrangement thus serves as a dynamic yaw damper. Also, if the craft in straight and level flight encounters side slip effects, such are detected by the side slip sensor 167 which supplies corrective effects directly through the summing device 19 and indirectly through the integrator 151 and summing device 18.

When changing heading as in a banked turn, operation of the ailerons to bank the craft results in a rudder control signal from the aileron servomotor operated displacement means 142 to initiate operation of the rudder surface to coordinate the operation of rudder to ailerons. The operation of the rudder in response to aileron displacement prevents an adverse yaw of the craft about its vertical axis. In addition, to overcome yawing effects of the craft due to the banking motion of the craft, a corrective action is provided by the roll rate gyroscope 93 directly into the summing device 21.

The yaw rate gyroscope 192 would resist the change in heading of the aircraft and to compensate for its effect, the roll rate gyroscope response is integrated through integrator 204 to obtain the equivalent of the bank angle of the aircraft. Since the rate of turn sensed by the gyroscope 192 is a function of the bank angle of the craft, the effect of the integrator is to substantially cancel the effect of the yaw rate gyroscope 192. Thus, during the steady state portion of the turn, the yaw rate gyroscope 192 exerts no effect on the servomotor 110 tending to prevent turning of the plane. If the output from the integrator 204 does not substantially cancel the effect from the yaw rate gyroscope 192 the difference is fed back to the integrator 204 until its output to summing device 22 does cancel the effect of gyroscope 192.

By means of the above recited calibrated control signals to the rudder as the craft is banked, the operation of the rudder and ailerons are substantially coordinated to effect a coordinated turn, that is one without side slip or skid.

If the turn is not actually coordinated, the side slip sensor 167 through summing device 19 directly supplies a corrective effect to operation of the rudder to remove this lateral motion or side slip of the craft. Additionally the slide slip sensor 167 through the integrator 151 supplies a permanent correction through summing device 18 to the rudder control mechanism to permanently offset any tendency of the craft to sideslip during the turn after the initial side slip has been corrected. A brief analysis of the arrangement of Figure 1 is made which is based on given transfer functions of components thereof where the transfer function is the ratio of the output derived from the device with respect to its input.

Referring to Figure 1, the rudder control surface (not shown) of the aircraft is positioned from driving means 107 of a reversible electric rudder servomotor 110 which is reversibly controlled from a rudder servomotor voltage discriminator amplifier 111. The amplifier may be of the electronic type having an input control voltage circuit which is supplied with control signal voltages. Input control signals are supplied to the amplifier through member 14 with an input signal depending upon the algebraic difference of a control signal on conductor 15 and a servo position feedback from member 121 modified in accordance with craft indicated airspeed operated device 119.

The difference between the operations of members 15 and 121 as modified is effected through a differential device 17.

The control signal supplied to the member 15 is derived from a plurality of summing or differential devices 18, 19, 20, 21, and 22 connected in series relationship.

Beginning at the left, and considering the operation of the apparatus as in banked turn by inspection the summing or differential device 22 is supplied with input signals or control responses $e_1$, $e_5$ from a yaw rate gyro 192 and integrator 204. The response $e_1$ is derived from the operation of the yaw rate gyroscope 192 which detects rate of movement of the aircraft about its vertical axis. The response $e_5$ is derived from the operation of the integrator 204 as stated. In the diagram of Figure 1 of the rudder control system the following mathematical relationships which are in effect during banked turns are obtained.

(1) $\quad e_2 = e_1 - e_5$ (2) $\quad e_5 = \dfrac{e_4}{j\omega\tau_1}$ (3) $\quad e_4 = e_2 + e_3$ (4) $\quad e_2 = e_1 - \dfrac{e_2}{j\omega\tau_1} - \dfrac{e_3}{j\omega\tau_1}$ (5) $\quad e_2\left(1 + \dfrac{1}{j\omega\tau_1}\right) = e_1 - \dfrac{e_3}{j\omega\tau_1}$ (6) $\quad e_2 = \dfrac{j\omega\tau_1}{1+j\omega\tau_1}\left(e_1 - \dfrac{e_3}{j\omega\tau_1}\right)$ Thus, starting with yaw rate $e_1$ and roll rate $e_3$, the signal $e_2$ from Equation 6 corresponds to the quantity $$\left(e_1 - \dfrac{e_3}{j\omega\tau_1}\right)$$

or the quantity $$\left(e_1 - \dfrac{1}{\tau_1}e_3\right)$$

passed through a high pass filter defined by $$\dfrac{j\omega\tau_1}{1+j\omega\tau_1}$$

The gain factor $$\dfrac{1}{\tau_1}$$

of the integrator 204, which in the present instance is the ratio of rate of change of output voltage on integrator operated potentiometer 195 with rate of change of input voltage on integrator amplifier terminals 208, 209, is to be chosen for steady state turn coordination in the absence of the high pass filter effect. In other words, the gain factor $$\dfrac{1}{\tau_1}$$

is of such value as to give a steady state turn coordination with the one input 26, Fig. 1, to differential device 27 inoperative, thus conductor 247, Fig. 2, corresponds functionally to input 26 to differential 27, Fig. 1. The factor $$\dfrac{1}{j\omega}$$

is a mathematical operator denoting an integration when considering sinusoidal signals.

This condition holds for shallow banked turns because while the rate of turn generally is proportional to the sine of the bank angle, for shallow banked turns the angle and its sine are about equal and the rate gyro 192 and integrator 204 provide equal and opposing signals. The steady state turn mentioned is that portion of the turn wherein the yaw rate gyroscope 192 provides a steady value output signal. The transfer function $$\dfrac{e_5}{e_4}$$

of integrator 204 is $$\dfrac{1}{j\omega\tau_1}$$

However, an essential feature of the invention is the feedback from conductor 26 in proportion to the quantity $e_2$ into the summing device 27 to provide a high pass filter effect in the determination of the quantity $e_2$. The feedback over the conductor 26 has a double function, (1) it corrects for any discrepancy that may have arisen due to the lack of proper calibration or exact determination of the value of the factor $$\dfrac{1}{\tau_1}$$

and (2) it corrects for inaccuracies arising in the system due to the use of a linear approximation to the proper coordinating function i. e. bank angle, rather than the function itself or sine of the bank angle. For example, the response of the yaw rate gyro 192 is proportional to the craft rate of yaw which is proportional normally to the sine of the bank angle and not linearly proportional to the magnitude of the bank angle itself which latter is provided by the integrator 204. Except for small bank angles where the sine of the bank angle is directly proportional to the value of the bank angle, a self correction by the feedback conductor 26 is effected.

Thus the high pass filter effect reduces the criticalness of the coordination computation stated between the yaw rate gyro response and operation of integrator 204 involving the gain factor $$\dfrac{1}{\tau_1}$$

and also can be chosen to provide additional phase lead in the input circuit at the Dutch roll frequency.

The signal $e_2$ is thereafter summed at differential 21 with a signal derived from member 171. The signal on member 171 is derived from the operation of a roll rate gyroscope 93 which operation is modified in accordance with an airspeed compensator 33. The output from the summing device 21 is modified at summing device 20 by the signal appearing upon a member 143. The signal on member 143 is in accordance with the displacement of the aileron control surface as modified by the airspeed compensator 36. The output signal from summing device 20 is modified at summing device 19 in accordance with the signal on member 160. The signal on member 160 is in accordance with the magnitude of the sideslip of the craft detected by the sideslip sensor 167. The output signal from the summing device 19 is modified at summing device 18 by a signal appearing on member 144. The signal on member 144 is derived from an integrator 151 which has its input signal supplied by members 168, 169 proportioned to the magnitude of the sideslip detected by sensor 167. The output signal of the summing device 18 appears upon member 15 as described.

While the block diagram of Figure 1 indicates that in the level flight mode of the craft the signal from the yaw rate gyroscope provides the primary yaw and Dutch roll stabilization signal to control the rudder and that in the second mode, as during banked turns, operation of the rudder stems from displacement of the aileron as reflected by the operation of device 142, for fuller description of the relationships of the signal and details of structure of the components providing them reference is made to Figure 2.

In Figure 2 there is shown an aileron control channel 40 and a rudder control channel 106 which together constitute a two axis automatic pilot. In the aileron control channel 40, the aileron control surfaces (not shown) are positioned from cables 41. The cables 41 extend about a cable drum 50 and thus may be operated upon rotation of the drum or alternatively by a manually operable control stick 42 of a conventional type pivoted at 43 on the craft and suitably connected to the cables 41 at points 44 and 45. The drum 50 is positioned by an aileron servomotor 46 which is reversibly controlled from an amplifier 47. The motor 46 may include a pair of brake windings and alternatively energizable clutch windings. The brake windings and amplifier may be connected through a manually operable single pole single throw switch 48 to a battery 49 whereby energization of the brake windings serves to operatively couple the servometer 46 to the cable drum 50. The clutch windings are alternatively energized from an output derived from amplifier 47. Specifically, amplifier 47 includes a pair of alternatively operated relays for coupling one or the other of the clutch windings through the manually operable switch 48 to the battery 49. One or the other of the relays is operated dependent upon the instantaneous phase relationship between the voltage across terminals 50, 51 connected to the ship's supply and the input control voltage applied across amplifier terminals 52, 53. The amplifier-motor combination may be similar to that disclosed in Patent No. 2,425,734 to Willis H. Gille et al.

Connected to the amplifier input signal terminals 52, 53 is a balanceable voltage network 54. Network 54 comprises a plurality of voltage generators 55, 70, 78, 87, and 97. Voltage generator 55 comprises a follow-up potentiometer 56 having a slider 57 and resistor 58, a voltage dividing potentiometer 59 comprising an adjustable tap 60 and resistor 61 and a transformer 62 having a secondary winding 63 and a primary winding 64. Resistor 58 is connected across the secondary winding 63. Resistor 61 has one end connected to slider 57 and its remaining end connected to a center tap of secondary winding 63. A conductor 67 connects adjustable tap 60 to amplifier terminal 53. Slider 57 is adjusted along resistor 58 in either direction from the electrical center thereof by a suitable operating means 65 connected to the output shaft 66 of the aileron servomotor 46 whereby the slider 57 assumes a displacement from its center position in proportion to the displacement of the aileron control surfaces. Signal generator 70 comprises a manually operable trim potentiometer 71 having a slider 72 and a resistor 73 which is connected across another secondary winding 75 of the multiple secondary winding transformer 62. Slider 72 has an adjustable knob 74 connected thereto for facilitating moving the slider along resistor 73. A conductor 76 connects slider 72 with the center tap of secondary winding 63 in generator 55. Generator 78 comprises a roll attitude potentiometer 79 having a slider 80 and resistor 81 which is connected across a secondary winding 82 of the transformer 62. A conductor 83 connects slider 80 with the center tap of secondary winding 75 of signal generator 70. The slider 80 is positioned through a suitable operating connection 84 by a vertical gyroscope 85. The displacement of slider 80 from the electrical center of resistor 81 is in proportion to the angular departure of the roll attitude of the craft from its level position and the direction of displacement of slider 80 from the center of resistor 81 depends upon the direction of inclination of the craft about its roll axis. The gyroscope 85 is of a conventional type having a rotor provided with its spin axis orientated in a vertical position in a casing which is carried on trunions in an outer gimbal ring on a horizontal axis. The gimbal ring in turn is pivoted about a horizontal axis at right angles to the axis of the casing trunions so that slider 80 is operated when the craft moves about its roll axis. Signal generator 87 comprises a roll rate potentiometer 88 having a slider 89 and a resistor 90. Resistor 90 is connected across a secondary winding 91 of the transformer 62. A conductor 92 extends from a center tap of secondary winding 82 to slider 89. Slider 89 is positioned along resistor 90 through a suitable operating connection 94 by a roll rate gyroscope 93. The gyroscope 93 is of a conventional type having its rotor spin axis in a horizontal position parallel with the pitch axis of the aircraft. The rotor is trunioned in a gimbal ring which in turn is carried for rotation about an axis parallel with the vertical axis of the craft. The slider 89 is biased to its normal or center position by suitable springs 95, 95 extending from the slider to the craft. The displacement of slider 89 from its center position on resistor 90 depends upon the rate of roll of the craft about its longitudinal axis and the direction of the displacement from the center position depends upon the direction of motion of the craft about its longitudinal or roll axis. Signal generator 97 comprises a manually operable turn potentiometer 98 having a slider 99 and resistor 100 which is connected across a secondary winding 101 of the transformer 62. A conductor 102 connects slider 99 with a center tap of secondary winding 91. A ground conductor 104 extends from a center tap of secondary winding 101 and it has a common ground with the ground conductor 105 extending from amplifier terminal 52 whereby the network 54 is completed. The slider 99 may be positioned along resistor 100 by a suitable operable knob 103 affixed thereto.

The rudder control surface (not shown) as stated is operated by cables 107 extending from a cable drum 108 carried on an output shaft 109 of a rudder servomotor 110. The rudder servomotor 110 is similar to the aileron servomotor 46 and includes a pair of brake windings and alternatively energizable clutch windings. The brake windings are connected through a single pole single throw switch 112 to a battery 113 to operatively connect the rudder servomotor 110 to the cable drum 108. The motor 110 is reversibly controlled from a rudder servomotor amplifier 11 which is similar to the aileron servomotor amplifier 47. The amplifier 111 includes a pair of power input terminals 115, 116 and a pair of single input terminals 117, 118 which may be connected to the control electrodes of the amplifier.

A balanceable voltage network 120 is connected across the input terminals 117, 118. The balanceable voltage network 120 consists of a network rebalance signal generator 121, an aileron position signal generator 143, a sideslip integration signal generator 144, a trim signal generator 152, a sideslip signal generator 160, a craft roll rate signal generator 171, a craft yaw rate signal generator 182, and an integration signal generator 194. Signal generator 121 comprises a rebalance potentiometer 122 having a slider 123 and a resistor 124; a voltage dividing potentiometer 125 having an adjustable tap 126 and resistor 127, and a transformer 128 having a primary winding 129 for energizing a plurality of secondary windings one of which is secondary winding 130 in generator 121. Resistor 124 is connected across the secondary winding 130. Resistor 127 has one end connected to slider 123 and its opposite end connected to a center tap of secondary winding 130. A conductor 131 extends from tap 126 to amplifier terminal 118. The slider 123 is operatively driven from the output shaft 109 of servomotor 110 through a suitable operating connection 132 so that slider 123 assumes a position from the midpoint of resistor 124 in accordance with displacement of the rudder control surface from its normal position. Signal generator 143 comprises an aileron position potentiometer 134 having a slider 135 and resistor 136; a voltage dividing potentiometer 137 having a manually adjustable tap 138 and a resistor 139; and secondary winding 140 of the transformer 128. Resistor 136 is connected across the ends of secondary winding 140. Resistor 139 has one end connected to slider 135 and its opposite end to a center tap of secondary winding 140. A conductor 141 extends from slider 135 to the center tap of secondary winding 130 of generator 121. Slider 135 is positioned along resistor 136 in either direction from its center by a suitable operating connection 142 which is positioned in accordance with the displacement of the aileron control surface of the craft. Signal generator 144 comprises a potentiometer 145 having a slider 146 and resistor 147 which is connected across a secondary winding 148 of the transformer 128.

A conductor 149 extends from a center tap of winding 148 to adjustable tap 138 in signal generator 143. Slider 146 is operated over resistor 147 by a suitable driving connection extending from a sideslip integrator 151 to be described. Network trim signal generator 152 comprises a potentiometer 153 having a slider 154 and resistor 155 which is connected across a secondary winding 156 of transformer 128. A conductor 157 connects slider 154 to slider 146 of signal generator 144. Slider 154 may be operated over resistor 155 by a suitable manually operable knob 158 affixed thereto. Signal generator 160 comprises a slideslip potentiometer 161 having a slider 162 and resistor 163 which is connected across secondary winding 164 of the transformer 128. A conductor 165 connects slider 162 with a center tap of secondary winding 156 of generator 152. Slider 162 is positioned along resistor 163 in either direction from the center thereof in accordance with the sideslip angle of the craft, this operation being effected through a driving means 166 connecting slider 161 with a sideslip sensing vane 167. Signal generator 171 comprises a roll rate potentiometer 172 having a slider 173 and resistor 174; a voltage dividing potentiometer 176 having a manually adjustable tap 177 and resistor 178; and a secondary winding 175 of the transformer. Resistor 174 is connected across the secondary winding 175. Resistor 178 has one end connected to slider 173 and its opposite end connected to a center tap of secondary winding 175. A conductor 179 connects slider 173 with a center tap of secondary winding 164 in generator 160. Slider 173 is positioned along resistor 174 in either direction from the center thereof by an operating connection 180 extending between slider 173 and the roll rate gyroscope 93. Signal generator 182 comprises a yaw rate potentiometer 183 having a slider 184 and resistor 185; a voltage dividing potentiometer 186 having a manually adjustable tap 187 and resistor 188; and a secondary winding 189 of the transformer 128. Resistor 185 is connected across the secondary winding 189 and resistor 188 has one end connected to slider 184 and the other end to a center tap of secondary winding 189. A conductor 190 connects slider 184 to the manually adjustable tap 177 of generator 171. Slider 184 is positioned along resistor 185 in either direction from center thereof by a suitable operating connection 191 connecting slider 184 with a craft yaw rate responsive gyroscope 192. The gyroscope is of the conventional type having a rotor with two axes of rotation, one its spin axis, the other its precession axis. Upon turning of the craft about its vertical axis the gyroscope moves angularly about its precession axis to adjust the slider 184. Restraining springs 193, 193 between slider 184 and the craft limit the precession of the gyroscope in accordance with the rate of angular motion about its vertical axis or rate of yaw. Signal generator 194 comprises an integration potentiometer 195 having a slider 196 and resistor 197; a voltage dividing potentiometer 198 having a manually adjustable tap 199 and resistor 200; and a secondary winding 201 of the transformer 128. The resistor 197 is connected across the secondary winding 201 and resistor 200 has one end connected to slider 196 and its opposite end connected to a center tap of secondary winding 201. A conductor 202 connects the adjustable tap 199 with the adjustable tap 187 in signal generator 182. A conductor 205 connects the center tap of secondary winding 201 to ground and the balanceable circuit is completed through the ground conductor 206 to amplifier terminal 117. Slider 196 is positioned along resistor 197 in either direction from the center thereof by an operating means 203 connected to the output side of the integrator 204. The integrator 204 may take the form of an amplifier motor combination comprising an amplifier 205 of the A. C. discriminator type having A. C. power input terminals 206, 207 and A. C. signal input terminals 208, 209. The amplifier output voltage appears upon the conductor 210 extending therefrom and the phase of the output voltage with reference to the voltage across winding 213 depends upon the phase relationship of the signal voltage across terminals 208, 209 with respect to the voltage across the power terminals 206, 207. The amplifier 205 controls a capacitor type induction motor 212 having line windings 213, amplifier winding 214 and rotor 215 inductively related to the windings. The line winding 213 is connected to the source of alternating current through a capacitor in series therewith and the winding 214 is connected to the output conductor 210 whereby the direction of rotation of rotor 215 depends upon the relative instantaneous phase of the signal voltage across the amplifier terminals 208, 209 with respect to the supply voltage across terminals 206, 207. The rotor 215 has an output shaft 216 which drives a velocity signal generator 217. The generator 217 conventionally comprises a line winding 218 termed a primary winding and a secondary winding 219 inductively related to winding 218 through a rotor. The voltage generated in winding 219 depends upon the rotational speed of the rotor. A voltage divider 220 has its resistor connected across the secondary winding 219 through a series capacitor and a conductor 222 connects its adjustable tap to a voltage divider 221. Thus a selected portion of the induced velocity voltage is applied to amplifier terminal 209. The feedback voltage from the velocity signal generator 217 causes the motor speed to be proportional to the control voltage signal applied to amplifier terminal 208. The control voltage for amplifier 205 is derived from a voltage network 224.

The integrator 204 is suitably proportioned to effect the desired mathematical ratio, between the voltage of signal generator 194 operated thereby which represents the output of the integrator 204 and the voltage applied to the amplifier 205 from network 224 which represents the integrator input, equal to the fraction $$\frac{1}{j\omega\tau_1}; \frac{1}{\tau_1}$$

is the gain factor involved in the operation of slider 196 from shaft 216 through gear train 225 and the factor $j\omega$ is the frequency of input voltage.

Network 224 derives its control signal voltages from a voltage dividing potentiometer 226 and a roll rate signal from generator 229. The voltage divider 226 comprises a manually adjustable tap 227 and resistor 228 which has one end connected to slider 184 of signal generator 182 and its opposite end connected to the center tap of secondary winding 201 of generator 194 whereby the outputs of signal generators 182, 194 are applied across resistor 228. Generator 229 comprises a roll rate potentiometer 230 having a slider 231 and resistor 232 which is connected across a secondary winding 233 of the transformer. A conductor 247 connects tap 227 to a center tap of winding 233. Slider 231 is operated by roll rate gyroscope 93 through suitable movement of transmission means 248. Across slider 231 and the center tap of secondary winding 233, which constitute the output terminals of signal generator 229, is a resistor 235 of a voltage dividing potentiometer 234. The potentiometer 234 includes an adjustable tap 236 which is positioned in accordance with the indicated air speed of the craft by an airspeed responsive device 237. An altitude compensating potentiometer 239 includes an adjustable tap 241 and resistor 240. The resistor 240 is connected across the adjustable tap 236 and the center tap of secondary winding 233. The adjustable tap 241 is positioned along resistor 240 in accordance with the changes in altitude of the craft from an altitude sensing device 242 whereby the voltage appearing between tap 241 and the center tap of secondary winding 233 is compensated for indicated air speed and altitude so that the available signal from generator 229 is increased with increase in airspeed and increased with increase of altitude. A manually adjustable voltage divider 243 has its resistor 244 connected across adjustable tap 241 and ground conductor 211. An adjustable tap 245 of voltage divider 243 has a conductor 246 extending therefrom to amplifier input terminal 208. Thus the voltage dividing potentiometer 243, which in effect is connected across the signal generator 229 and the voltage dividing potentiometer 226 determines the amount of the signal voltage derived from signal generator 229 and voltage divider 226 that will be applied to amplifier 205.

The side slip integrator 151 which operates slider 146 of signal generator 144 may be similar in form to the integrator 204. The input control signal voltage for controlling integrator 151 is supplied from the side slip signal generator 160 by suitable conductors 168, 169 connecting the slider 162 and the center tap of secondary winding 164 to the input to the integrator. Suitable means such as an isolation transformer may be provided in the side slip integrator 151 to prevent grounding the balanceable network 120 of amplifier 111 through the integrator.

The manually operable single pole single throw switches 48, 112 are used to engage and disengage the aileron control channel 40 and the rudder control channel 106 from their respective control surfaces. With the switches 48 and 112 in the non-operated position and the craft in level flight attitude, should the craft be of the type having low directional stability the craft will oscillate with small amplitudes about its vertical axis and will undergo Dutch roll oscillations. With the switch 112 in the operated position, such oscillations about the vertical axis are sensed by the yaw rate gyroscope 192 which supplies a signal voltage in network 120 effecting operation of the rudder amplifier 111 and rudder servomotor 110 to position the rudder to damp out such oscillations.

With the two channels 40 and 106 engaged, changes in craft heading may be effected through the automatic pilot by rotating knob 103 in the aileron channel to displace slider 99 relative to resistor 100. This displacement causes the generator 97 to supply a signal voltage in aileron control network 54 which effects operation of amplifier 47 and aileron servomotor 46 to position the ailerons. As the craft banks under the applied ailerons, the vertical gyroscope 85 operates slider 80 to supply an opposing signal whereby the ailerons return to their zero position limiting the bank angle so that the signal derived from signal generator 97 is equal and opposite to that provided by generators 78. In the rudder channel, due to displacement of the aileron surfaces in initiating the bank, the aileron position slider 135 in the rudder channel is displaced causing the signal generator 143 to unbalance network 120 effecting operation of the rudder surface. Also due to the rate of roll of the craft resulting from the displaced aileron surfaces, the roll rate gyroscope operates slider 173 in the rudder channel to additionally control operation of the rudder servomotor 110.

The rate of change of heading of the craft when in a banked turn is proportional to the bank angle for small bank angles of the craft. Thus the output of the yaw rate gyroscope 192 would theoretically be equal to the integration of the roll rate of the craft which integration is proportional to the craft bank angle. The craft roll rate mentioned is reflected by displacement of slider 231 which causes the signal generator 229 to supply a control signal in network 224 for effecting operation of the integrator 204. The integrator 204 displaces slider 196 in signal generator 194 to provide a voltage proportional to the integration of roll rate which is therefore roll angle voltage. This is opposed to the signal from rate of turn generator 182 in network 120 which controls the rudder amplifier 111. Thus for a theoretical situation the integrated roll rate signal from generator 194 is equal and opposite to the yaw rate signal from generator 182. Thus the calibrated correction from signal generator 194 balances the signal from generator 182. However, if this difference is not equal to zero, any difference between the signals provided by generator 194 and generator 182 in addition to the signal from generator 229 is supplied to the input network of integrator 224 whereby the steady-state voltage from generator 194 is made to approach that from generator 182 at a rate determined by the time constant of the system. Thus the rate of change in heading is coordinated to the bank angle of the craft to provide a coordinated turn.

However, if this turn be not coordinated by the calibrated signal from generator 194, the vane 167 senses such side slip or miscoordination of the craft and operates through its signal generator 160 directly and through the side slip integrator generator 144 to effect further operation of the rudder to provide proper coordination of flight in the banked turn.

If the aileron engage switch 48 be moved to unoperated position but switch 112 be in operated position, change in heading may also be effected by operation of the aileron surfaces directly from the control stick 42. The manual displacement of the ailerons also effects operation of aileron position responsive slider 135 in signal generator 143 in the rudder channel whereby the rudder surface is displaced along with the aileron surface to initiate a banked turn. The roll rate gyroscope, through the integrator 204 operates along with the yaw rate gyroscope 192 to provide a calibrated voltage in the rudder network 120 for coordinating the rudder operation with the aileron operation to provide a coordinated turn of the craft. Again, any departures from this coordinated attitude are sensed by the side slip sensor 167 which effects re-positioning of the rudder surface to correct any side slip of the craft during the banked turn.

It will now be apparent that there has been provided a novel aircraft rudder control system which damps the oscillations of the craft about its vertical axis when in level flight due to the low directional stability of the craft and also coordinates the operation of the rudder surface with the operation of the aileron surfaces of the craft in a banked turn to materially reduce side slip of the craft during such banked turn. Since the invention may be embodied in other structures and variations in the components may be provided without departing from the spirit thereof it is understood that the invention is not limited to the specific form thereof disclosed but as limited by the following claims.

What is claimed is:

1. Control apparatus for an aircraft having ailerons and rudder surfaces, said apparatus comprising: means for operating said ailerons to effect a change in lateral attitude thereof about the roll axis; motor means for operating said rudder, balanceable means for reversibly operating said motor means; means responsive to operation of said aileron for unbalancing said balanceable means to effect displacement of said rudder; follow-up means driven by said motor means for rebalancing said balanceable means; means responsive to the rate of roll of the craft and connected to said balanceable means for directly altering the balance of said balanceable means; integrating means having a transfer function of the form $$\frac{1}{j\omega\tau_1}$$

and having input and output connections; means for coupling the roll rate responsive means to said input; additionally combining means; an aircraft yaw rate responsive means; connection means for connecting the output of the integrator and the yaw rate responsive means to the combining means to obtain a differential effect;

means for applying the differential effect to the balanceable means, and further means for also applying the differential effect to the integrator in opposing relation to the roll rate responsive means, and wherein $$\frac{1}{j\omega}$$

is a mathematical operator denoting an integration when considering sinusoidal signals and $$\frac{1}{\tau_1}$$

is the gain factor of the integrating means.

2. Control apparatus for an aircraft having rudder and aileron control surfaces, comprising: motor means for positioning the rudder; means including a balanceable network connected to the motor means for operating said motor means on unbalance of the network; means responsive to aileron operation unbalancing said network; follow-up means driven by the motor means and connected to the network to rebalance the network; craft roll rate responsive means connected to the network for altering the balance of the network directly; an integrator having a transfer function or ratio of output to input of the form $$\frac{1}{j\omega\tau_1}$$

a craft yaw rate responsive device; means differentially combining the operation of the yaw rate device and the output of the integrator and connected to the network to alter the balance of the network; and additional means operated by the differential combining means and the craft roll rate responsive means and connected to the input of the integrator, wherein the factor of the transfer function is selected to provide steady state turn coordination of the craft in a banked turn, and wherein $$\frac{1}{j\omega}$$

is a mathematical operator denoting an integration and $$\frac{1}{\tau_1}$$

is the gain factor of the integrating means.

3. Control apparatus for an aircraft having aileron and rudder control surfaces, said apparatus comprising motor means for operating the rudder surface; means including a balanceable network connected to the motor means for operation thereof on unbalance of said network; aileron displacement responsive means unbalancing said network; follow-up means driven by the motor means to rebalance the network; craft roll rate responsive means for altering the balance of the network; further means for alterning the balance of said network; means for operating the further means comprising: an integrator having a ratio of output to input of the form $$\frac{1}{j\omega\tau_1}$$

an aircraft rate of turn gyroscope having a response equal to the quantity $e_1$, means connected to the gyroscope and integrator for differentially combining the operation of the rate of turn gyroscope and the output of the integrator to provide an operation of the further means equal to a quantity $e_2$, additional means operated by the roll rate responsive means to provide a quantity $e_3$, and means for differentially combining the quantities $e_2$ and $e_3$ and connected to the input of the integrator, so that the quantity $$e_2 = \frac{j\omega\tau_1}{1+j\omega\tau_1}\left(e_1 - \frac{e_3}{j\omega\tau_1}\right)$$

and wherein $$\frac{1}{j\omega}$$

is a mathematical operator denoting an integration and $$\frac{1}{\tau_1}$$

is the gain factor of the integrator.

4. Control apparatus for an aircraft having a first positionable means for controlling craft attitude about the roll axis and a second positionable means for controlling craft attitude about its vertical axis, said apparatus comprising: motor means for actuating the second positionable means; a balanceable network connected to said motor means for operation thereof on unbalance of the network; means operated by the first positionable means for unbalancing said network proportional to the first means operation, follow-up means driven by the motor means for rebalancing the network; an integrator having a ratio of output to input of the form $$\frac{1}{j\omega\tau_1}$$

where the factor $$\frac{1}{\tau_1}$$

represents the gain of the integrator; a craft yaw rate responsive device; a craft roll rate responsive device; differential means combining the output of the integrator and the yaw rate device and connected to said network for altering its balance; and further means for combining the output of the differential means and the roll rate device and providing the input to the integrator whereby the differential means has an output $e_2$ equal to an expression of the form $$\frac{j\omega\tau_1}{1+j\omega\tau_1}\left(e_1 - \frac{e_3}{j\omega\tau_1}\right)$$

where $e_1$ is the response of the yaw rate device and $e_3$ is the response of the roll rate device and $$\frac{1}{j\omega}$$

is a mathematical operator denoting an integration.

5. Control apparatus for an aircraft having ailerons and rudder control surfaces and operating means therefor, said appartus comprising: means for actuating both said aileron and rudder operating means to cause the craft to bank and turn under the applied ailerons and rudder; a craft turn rate responsive device, a craft roll rate responsive device; an integrator having a ratio of output to input quantity of $$\frac{1}{j\omega\tau_1}$$

where the factor $$\frac{1}{\tau_1}$$

is the gain of the integrator; first combining means operated by the turn rate device and the output of the integrator; second combining means operated by the first combining means and the roll rate device; connections from the second combining means to the integrator, and additional means controlled by the output of the first combining means for further positioning the rudder operating means, and wherein $$\frac{1}{j\omega}$$

is a mathematical operator denoting an integration.

6. The structure of claim 5, and having a device responsive to the side slip of the craft for further controlling the additional means.

7. Control apparatus for an aircraft having aileron and rudder control surfaces, said apparatus comprising: motor means for operating the ailerons, motor means for operating the rudder; control means for actuating the aileron motor means to displace the ailerons to set up a desired bank attitude of the craft; means effective during displacement of the ailerons to actuate the rudder motor means to effect a turn at a rate proportional to the bank angle; a rate of craft turn responsive device, a craft roll rate responsive device; an integrator controlled by the roll rate device and having an output proportional to the time integral of craft roll rate, and further means connected to the rudder motor means and controlled by the yaw rate device and the integrator output for effecting further actuation of the rudder motor means.

8. The apparatus of claim 7, and having the further means additionally connected to the input of the integrator wherein said integrator has a ratio of output to input equal to $$\frac{1}{j\omega\tau_1}$$

where the factor $$\frac{1}{\tau_1}$$

is the gain of the integrator, and the factor $$\frac{1}{j\omega}$$

is a mathematical operator denoting an integration.

9. Control apparatus for an aircraft having a first means for tilting the craft about its roll axis and second means for changing craft attitude about its vertical axis, said apparatus comprising: motor means adapted to operate the first means; motor means adapted to operate the second means; control means for actuating the first motor means to set up a desired bank attitude of the aircraft; means effective during displacement of the first means for tilting the craft to actuate the second motor means to effect a turn of the craft at a rate proportional to the bank angle thereof; a craft rate of turn responsive device; a craft roll rate responsive device; an integrator controlled by the roll rate device and having an output proportional to the time integral of the craft roll rate; and further means connected to the second motor means and controlled by the yaw rate device and the integrator output for effecting further actuation of the second motor means.

10. In a navigation arrangement for an aircraft of the type which may be caused to change heading in a banked turn from a present course: means for providing a first signal in accordance with a desired bank angle; means responsive to the bank of the craft for providing a second signal opposing said first signal; means combining said signals and supplying an output proportional thereto; a craft roll rate responsive signal generating device; a craft turn rate responsive signal generating means; an integrator supplying a signal and controlled by said roll rate responsive signal generating means; means combining the signals of the turn rate responsive means and integrator and supplying a signal proportional thereto; further means connected to the integrator and transmitting the signal thereto from the combining means; and additional means responsive to signals from the combining means and the roll rate responsive device and supplying a resultant control signal proportional to the two signals.

11. In a navigation arrangement for an aircraft whereby the craft may be caused to change heading in a banked turn from a present course: means for providing a first signal in accordance with a desired bank angle of the craft; means responsive to the bank of the craft for providing a second signal opposing said first signal; means combining said signals and supplying an output proportional thereto; an aircraft roll rate responsive signal generating device; a craft turn rate responsive signal generating means; integrator means of the motor operator type having a time constant $$\frac{1}{j\omega\tau_1}$$

and supplying a signal and controlled by said roll rate responsive signal generating means; means combining these signals of the turn rate responsive means and integrator and supplying a signal proportional thereto; further means connected to the integrator and transmitting the signal from the combining means thereto; additional means responsive to signals from the combining means and the roll rate responsive device and supplying a resultant control signal proportional to the two signals; and rudder control means operated in accordance with said resultant control signal, and wherein $$\frac{1}{j\omega}$$

is a mathematical operator denoting an integration and $$\frac{1}{\tau_1}$$

is the gain of the integrator means.

12. In a navigation arrangement for an aircraft having means to cause a change in heading through a banked turn from a present course said aircraft including a rudder surface, apparatus for coordinating the operation of the rudder surface for the bank angle of the craft comprising: a craft roll rate responsive signal generating device; a craft turn rate responsive signal generating means; an integrator of the motor driven type having a time constant $$\frac{1}{j\omega\tau_1}$$

and supplying a signal; first means combining said integrator signal and the craft turn rate signal to provide a first resultant signal; further means combining the craft roll rate signal and the resultant signal and providing a second resultant signal; means connecting the second resultant signal to the integrator for control thereof; an additional means combining signals from the first combining means and the roll rate responsive device; and rudder operating means controlled in accordance with a resultant control signal from said additional means, and wherein $$\frac{1}{j\omega}$$

is a mathematical operator denoting an integration and $$\frac{1}{\tau_1}$$

is the gain of the integrator.

References Cited in the file of this patent

UNITED STATES PATENTS

| | | |
|---|---|---|
| 2,617,615 | Von Eschen | Nov. 11, 1952 |
| 2,630,282 | Halpert | Mar. 3, 1953 |
| 2,634,925 | Kutzler | Apr. 14, 1953 |
| 2,686,021 | Halpert | Aug. 10, 1954 |